United States Patent

[11] 3,568,074

| [72] | Inventor | James W. Carroll |
| | | Waynesboro, Va. |
| [21] | Appl. No. | 749,511 |
| [22] | Filed | Aug. 1, 1968 |
| [45] | Patented | Mar. 2, 1971 |
| [73] | Assignee | General Electric Company |

[54] FREQUENCY-SENSITIVE CIRCUIT
6 Claims, 4 Drawing Figs.

[52] U.S. Cl. .................................................. 328/140,
307/233, 307/295, 329/110, 329/166, 340/171
[51] Int. Cl. ...................................................... H03b 3/04,
H03k 5/20
[50] Field of Search ............................................. 307/233,
295; 328/27, 32, 140; 329/110, 140, 166; 324/78;
333/7, 8, 76, 79; 321/9, 10; 340/171

[56] References Cited
UNITED STATES PATENTS
3,069,558 12/1962 Burt et al. ........................ 307/233
3,076,940 2/1963 Davis et al. ...................... 307/233X
3,202,921 8/1965 Wissel ........................... 307/233X

*Primary Examiner*—Stanley D. Miller, Jr.
*Attorneys*—I. David Blumenfeld, Stanley C. Corwin, Irving M. Freedman, Melvin M. Goldenberg, Frank L. Neuhauser and Oscar B. Waddell ABSTRACT: An AC input signal is divided between two branch circuits, one comprising an LC series resonance circuit in series connection with a first unidirectional current device, and the other comprising a resistor in series connection with a second unidirectional current device poled opposite to the first unidirectional current device. The two branch circuits are connected in parallel to a common output terminal. A nonpolarized capacitor is connected between the output terminal and an electrical reference or ground to bypass to ground the AC voltage component that otherwise would exist at the output terminal, and to provide a smooth DC signal having one polarity when the frequency of the AC input signal is within a predetermined frequency range and an opposite polarity when the frequency is outside the predetermined frequency range.

PATENTED MAR 2 1971          3,568,074
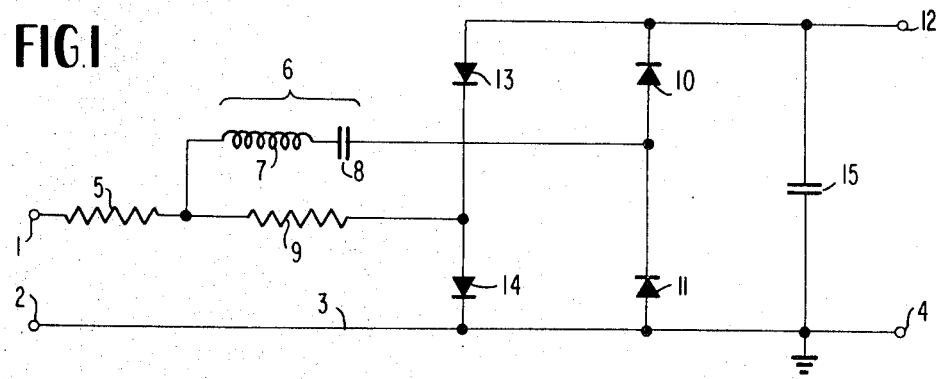
FIG.1
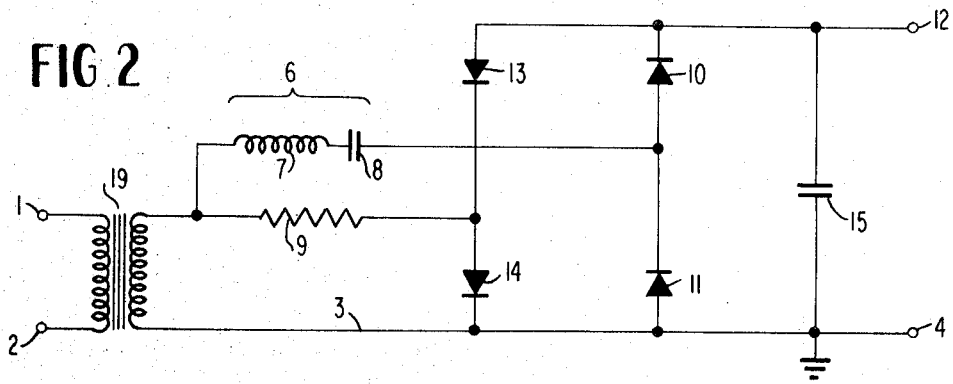
FIG.2
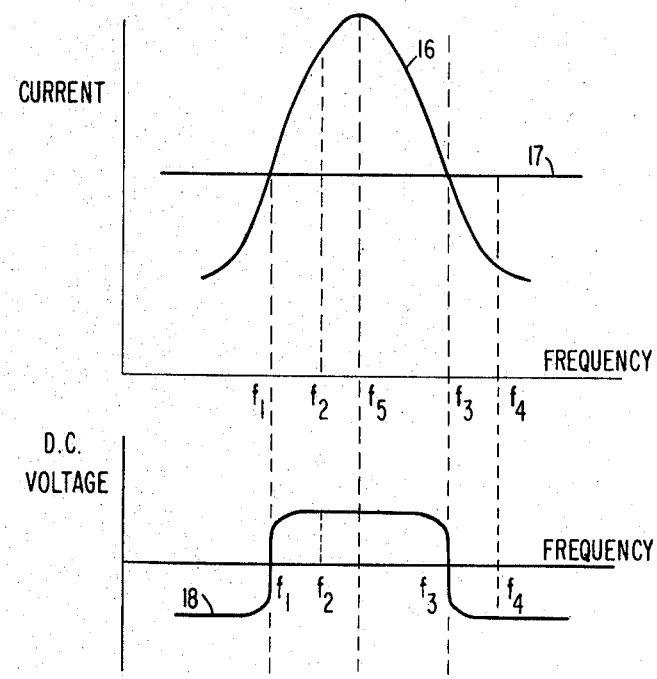
FIG.3
FIG.4
INVENTOR
JAMES W. CARROLL
BY  *Stanley C. Corwin*
ATTORNEY

FREQUENCY-SENSITIVE CIRCUIT

BACKGROUND OF THE INVENTION

This invention relates generally to alternating current control systems, and more particularly to a frequency sensitive circuit.

There are two basic types of frequency sensitive circuits. In one, the generated frequency is compared with the frequency of standard, as a tuning fork oscillator. This type of circuit requires integration of the area between the generated and reference signals and usually uses a mechanism having moving ports in the performance of the comparing and integrating operations. The major objections to this type of circuit is that it is complicated in structure, large in size, expensive to manufacture, and incorporates moving parts which wear and require maintenance.

The other type of frequency sensitive circuit couples the generated frequency to one or more tuned circuits. One such circuit uses a frequency sensitive circuit comprising a relay having two electromagnetic windings, each connected to its own rectifier circuit. One of the rectifier circuits is connected to an AC power source in series with a first frequency sensitive circuit. The other rectifier is connected to the same power source in series with another frequency responsive circuit in which the frequency response differs from that of the first circuit. The two windings on the relay are connected in opposition so that when the currents through the windings are equal no magnetic flux will be developed in the relay coil. A major objection to this type of circuit is that it is not independent of changes in the input signal voltage, primarily because the operation of the relay will depend upon the development of a net magnetic flux in excess of a threshold value. Furthermore, because of the large number of rectifier elements, i.e. diodes, used, the circuit is less likely to be independent of ambient temperature variations.

Circuits employing the principles of my invention enjoy particular utility in AC control systems for controlling the frequency of operation parallel power generator, alternator, systems in such assemblies as aircraft power systems or the like. However, it will be appreciated that the circuit of the present invention is one of general utility and may be employed wherever it is necessary or desirable, in alternating current power systems, to restrict the application of power to a relatively narrow frequency range, to utilize a signal having one polarity when the frequency of the AC signal is within a predetermined frequency range and an opposite polarity when the frequency is outside the predetermined frequency range.

SUMMARY OF THE INVENTION

It is, therefore, an object of the present invention to provide a frequency sensitive circuit for generating a direct current signal of a polarity indicative of whether the input AC signal is within or outside a proper preselected frequency range, and which is independent of changes in the AC input signal voltage.

Another object of the present invention is to provide a frequency sensitive circuit with a common input and output electrical reference or ground, and which may thus feed its output signal to a single load device such as a transistor.

Another object of the present invention is to provide a frequency sensitive circuit with an inherent output voltage limiting characteristic, and which eliminates the need for additional components to protect the electronic circuitry that may be used to detect the output signal polarity, i.e. a transistor.

Briefly stated, the invention comprises two branch circuits connected to opposite ends of a nonpolarized capacitor. One branch includes a frequency responsive circuit connected in series with a first unidirectional current device. The other branch circuit includes a resistor connected in series with a second unidirectional current device poled in opposition to the first unidirectional current device. If the branch circuit currents are equal no DC potential will be developed across the capacitor; inequality in branch circuit currents will develop a DC voltage across the capacitor.

BRIEF DESCRIPTION OF THE DRAWING

While the specification concludes with claims particularly pointing out and distinctly claiming he subject matter which I regard as my invention, a preferred embodiment is disclosed in the following detailed description taken in connection with the accompanying drawing in which:

FIG. 1 is a schematic circuit diagram of the preferred embodiment of the invention;

FIG. 2 is a schematic circuit diagram of another embodiment of the invention;

FIG. 3 is a graph showing the variation of currents through the branch circuits when the frequency is varied; and FIG. 4 is a graph showing the variation of output voltage when the frequency is varied.

DESCRIPTION OF THE PREFERRED EMBODIMENT

Referring to FIG. 1, the alternating current power is applied to two input terminals 1 and 2, terminal 2 being connected through conductor 3 to output terminal 4 thereby forming a common electrical reference which may be grounded, as shown, if desired. Terminal 1 is connected to a resistor 5 which in turn is connected to a series resonant circuit 6 which includes an inductor 7 and a capacitor 8, these two elements being chosen so as to produce resonance at the desired frequency. The resistor 5 is also connected to a second resistor 9.

The series resonant circuit 6 is connected to the point of connection of two unidirectional current devices 10 and 11 which are electrically oriented in the same direction across an output terminal 12 and the output terminal 4, such that the positive half-cycle of alternating current flowing through the series resonant circuit 6 will pass to output terminal 12 while the negative half-cycle will pass to terminal 4. The resistor 9 is connected to the junction of a second pair of unidirectional current devices 13 and 14, electrically oriented in the same direction but opposite to that of the first pair of unidirectional current devices 10 and 11. The positive half-cycle of alternating current flowing through resistor 9 is to terminal 4 while the negative half-cycle is passed to terminal 12.

A nonpolarized capacitor 15 is connected across the output terminals 12 and 4. Since output terminal 4 is connected to an electrical ground, the capacitor 15 bypass to ground the AC voltage component that otherwise would exist at the output terminals and provides a smooth DC output signal limited to the voltage drop across two unidirectional current devices in the conducting mode.

The characteristics of series resonant circuits are well known and are illustrated in the graph in FIG. 3 where curve 16 represents the variation of current through the series resonant circuit as the frequency is varied. Curve 16 is also representative of the variation in the absolute value of the conductance of the series resonant circuit plotted against frequency. Curve 17 represents the invariance of current through the resistor 9 plotted against frequency.

At two values of frequency $f_1$ and $f_3$ curve 16 intersects curve 17. Therefore, the alternating current flowing through the series resonant circuit 6 and the resistor 9 are equal and the net DC potential developed across the output terminals 12 and 4 is zero.

If the value of the frequency of the input signal lies between the value of $f_1$ and $f_3$, e.g. $f_2$, the current through the series resonant circuit 6 is considerably greater than the current through the resistor 9 and thereby develops a DC output voltage of a positive polarity. Conversely, if the value of the frequency of the input signal is less than $f_1$ or greater than $f_3$, e.g. $f_4$, the current through the resistor 9 is considerably greater than the current through the series resonant circuit 6 and produces a DC output of negative polarity.

Curve 18 of FIG. 4 represents the variation in DC output voltage plotted against the frequency of the AC input signal, and illustrates the difference in polarity discussed above.

The AC input to the frequency sensitive branch circuits is through a relatively large resistor 5. Resistor 5 protects the inductor 7 against saturation and capacitor 8 against excessive voltage at the series resonant frequency when the current flow through the series resonant circuit is at a maximum.

FIG. 2 is a modification of the circuit shown in FIG. 1 wherein resistor 5 is omitted and the AC input signal is provided through a transformer with a low voltage secondary winding. Transformer 19 must be chosen such that the voltage developed in its secondary winding is sufficiently below that value of voltage that would cause the inductor 7 to saturate at the resonant frequency.

While there has been illustrated and described a particular embodiment of the invention, it would be obvious to those skilled in the art that various changes and modifications may be made without departing from the spirit and scope of the invention as set forth in claims appended hereto.

I claim:

1. A frequency sensitive circuit for providing a unidirectional current of one polarity to a load when the alternating voltage sensed is within a prescribed frequency range (predominately in the opposite direction) and a unidirectional current of the opposite polarity when the alternating voltage is outside said frequency range comprising:

a first branch circuit including a frequency selective resonant circuit and unidirectional current conducting means coupled between a source of alternating voltage of varying frequency and a load to supply current of one polarity of said load when said alternating voltage is applied thereto;

a second branch circuit including resistive means and unidirectional conducting means also coupled between a source of alternating voltage of varying frequency and said load means adapted to supply current of the opposite polarity to said load when said alternating voltage is applied thereto;

the impedance of the frequency selective resonant circuit and resistive means being at a selected upper and lower frequency of said alternating voltage to define said frequency range such that the impedance of the frequency selective resonant circuit is less than that of the resistive means within said prescribed frequency range and the magnitude of the current flow in said first branch circuit exceeds that in said second branch circuit and is greater than that of the resistive means outside of said frequency range and the magnitude of the current flow is less than the current flow in said second branch whereby a unidirectional current of one polarity is supplied to the load when the alternating voltage is within the prescribed frequency range, and a unidirectional current of the opposite polarity is supplied when the alternating voltage is outside said frequency range.

2. A frequency sensitive circuit as defined in claim 1 wherein the frequency selective resonant circuit is a series resonant circuit and the unidirectional current conducting means of said second branch are poled opposite to the unidirectional current conducting means of said first branch.

3. A frequency sensitive circuit as recited in claim 2 further including first and second input terminals and first and second output terminals, said first and second branches interconnecting the first input terminal to the first output terminal, and said second input and output terminals being interconnected to form a common current path.

4. A frequency sensitive circuit as recited in claim 2 wherein said series resonant circuits comprises an inductor and a capacitor in series connection.

5. A frequency sensitive circuit as recited in claim 4 wherein the unidirectional current conducting means of said first and second branches each comprises a pair of rectifiers oriented to conduct current in the same direction.

6. A frequency sensitive circuit as recited in claim 5 wherein said series resonant circuit is connected to the pair of rectifiers for the first branch at the point of rectifier interconnection and the resistive means is connected to the pair of rectifiers for the second branch at the point of rectifier interconnection.